United States Patent Office 3,293,226
Patented Dec. 20, 1966

3,293,226
PROCESS FOR THE HALOGENATION OF POLYMERS AND COPOLYMERS OF BUTADIENE
Emery A. F. de Schrijver, Amsterdam, Netherlands, assignor to Shell Oil Company, New York, N.Y., a corporation of Delaware
No Drawing. Filed Nov. 8, 1963, Ser. No. 322,501
Claims priority, application Netherlands, Apr. 16, 1963, 291,579
7 Claims. (Cl. 260—85.1)

The invention relates to a process for the preparation of halogenation products of homopolymers of butadiene-1,3 and copolymers of butadiene-1,3 with monovinyl compounds. For brevity these homopolymers and the said copolymers will hereinafter be indicated as polymers.

The invention also relates to halogenation products obtained according to the new process, to compositions prepared therefrom and to objects made from the said products or compositions.

According to the prior art, polymers of butadiene may be chlorinated in solutions in various liquids, for example chloroform, 1,2-dichloroethane and chlorobenzene. In these liquids the halogenated product is soluble, so that its separation is difficult. Carbon tetrachloride has been used as a medium, in which the chlorinated product is insoluble. The fact that, nevertheless, carbon tetrachloride is unsuitable must be based on the property of the product obtained in this medium of being insoluble in other liquids as well, as a result of a three-dimensional structure.

Now, in accordance with this invention, it has now been found that the polymers of butadiene may be halogenated in a tetrahalomethane solvent with formation of products which are not soluble in the same, but are soluble in many other organic liquids, if during halogenation a sufficient amount of hydrogen halide is dissolved in the medium.

The present process can be more closely defined as a process for the halogenation of homopolymers of butadiene-1,3 and/or of copolymers of butadiene-1,3 with monovinyl compounds by bringing solutions of these polymers in a tetrahalomethane into contact with an elementary halogen whose atomic weight is greater than 30, the characteristic feature being that in the polymer solutions are dissolved one or more hydrogen halides whose halogen atoms have an atomic weight which is greater than 30.

Although hydrogen iodide may also be used as hydrogen halide, hydrogen chloride and hydrogen bromide are the principal representatives.

The homopolymers and copolymers which may be applied according to the new process include both solid and liquid species as well as mixtures of these two.

Of the copolymers of butadiene-1,3 with monovinyl compounds are considered the copolymers with vinyl aromatic hydrocarbons such as styrene; acrylonitrile, vinyl chloride, vinylidene chloride and in general with all the monomers in which the group $>C=CH_2$ occurs once, without other double carbon/carbon bonds being present. The homopolymers and copolymers may have been prepared in various ways, for example by Ziegler polymerization, emulsion polymerization or polymerization in the presence of sodium, but should of course be soluble in the inert solvent envisaged.

The copolymers contemplated are those containing at least about 65% by weight of butadiene copolymerized therein. The copolymers may be random, graft or block copolymers. Of the latter, the favored structure is A–B–A, wherein B is a polybutadiene block and each A is a polymer block of a vinyl aromatic hydrocarbon such as styrene.

The indications "homopolymers" and "copolymers" also include the partially hydrogenated homo- and copolymers, respectively.

The easiest way to carry out the present process is by using polymer solutions saturated with hydrogen halide. The envisaged quantity of hydrogen halide is preferably dissolved in the polymer solutions before these solutions are contacted with the elementary halogen.

The hydrogen halides will in most cases be introduced into the polymer solution in the gaseous state. It is also possible, however, to add liquid hydrogen halides to the polymer solutions. If desired, the polymers may be dissolved in the solvents only after the hydrogen halides have been added. The effect of the hydrogen halide is stronger according as its concentration in the polymer solutions is higher. It is therefore advisable to pass the hydrogen halides at a low temperature into the polymer solutions (preferably until the latter are saturated with them) and/or to work at a higher hydrogen halide gas pressure. As a rule, the best results can be obtained at temperatures of from −30° C. to +50° C. and hydrogen halide gas pressures varying from atmospheric pressure to at most 15 atm. The halogenation is then performed under the same or almost the same conditions as regards temperature and hydrogen halide gas pressure as under which the hydrogen halides were dissolved in the polymer solutions.

At temperatures of from −30° C. to −10° C. a hydrogen halide pressure of 1 atmosphere is sufficient. As soon as higher temperatures are used, however, for example −10° C. to +50° C., it is desirable to increase the hydrogen halide gas pressure to above 1 atm.

At temperatures of from +15° C. to +25° C. hydrogen halide gas pressures of from 4 to 10 atm. are preferred.

The process according to the invention yields the best results if care is taken that during halogenation the concentration of dissolved polymer, calculated on solvent, is not higher than 8 percent by weight, preferably not higher than 5 percent by weight. This aspect is one of concerning viscosity as it relates to efficient mixing of the reaction components, and will vary with the intrinsic viscosity of the polymer.

When the new process is used the presence of water is no objection whatsoever, as long as the water is completely dissolved in the inert solvent.

Of the tetrahalogenated methanes serving as inert solvents in the process, one will as a rule choose as solvent $CCl_4$, from which the halogenation products can be isolated in a simple way. Other examples of an inert solvent that can be applied in the present process are trichlorobromomethane, dichlorodibromomethane and tribromochloromethane.

If halogenation is performed in, for example, $CCl_4$ without special measures being taken, at first almost exclusively addition of halogen takes place and no substitution. As addition of halogen proceeds, the solubility of the polymer in $CCl_4$ decreases more and more. Finally, the rate at which halogen is taken up drops rapidly. Addition is then almost completed and the halogenation product has become completely insoluble in the medium, so that if desired it can be readily isolated from it, for example by filtration and centrifuging. The now insoluble product has no cross-linked structure, however, and is therefore soluble in other solvents, i.e., solvents which under the reaction conditions prevailing during halogenation are not inert, for example benzene, toluene, acetone, cyclohexanone, chloroform, di, tri, tetra and pentachloroethane or mixtures of two or more of these substances.

The addition halogenation products thus obtained, which have become insoluble in carbon tetrachloride, are often still vulcanizable.

The above halogenation by no means requires intimate stirring. If desired, stirring can even be altogether omitted.

With a view to certain applications and the stability of the products one may as a rule be inclined to continue halogenation even further under conditions where a relatively rapid substitution halogenation occurs, such as irradiation with ultra-violet light or application of catalysts, such as iodine during chlorination or also benzoyl peroxide, stannic chloride, antimony oxychloride and such like.

These substitution halogenations can, if desired be performed in the original medium used for the addition halogenation, the phase separated during the addition halogenation dissolving after some time again. In this second halogenation step, however, also other organic media may be used.

The substitution halogenation is preferably performed, however, in aqueous medium, the advantage then being that the reaction products are also in this case easy to isolate from the medium.

In chlorinating polybutadiene in $CCl_4$ the addition chlorination is as a rule continued until the chlorine content has risen to about 40–56 percent by weight. At a chlorine content of about 40% w. the products begin to become insoluble in $CCl_4$. At a chlorine content of about 56% w. the addition chlorination is completed, which becomes visible by a slight yellowing, caused by the excess of chlorine then formed. Subsequent substitution chlorination yields products the chlorine content of which is 68–72% w. These products are considerably more stable, soluble both in $CCl_4$ and in other usual solvents and comparable with after-chlorinated polyvinyl chloride.

The intrinsic viscosity of the products obtained after substitution halogenation may be varied within certain limits by changing, for example, the medium applied, the intensity and the duration of the irradiation, the temperature, the catalyst concentration, etc. When substitution halogenation takes place in the presence of organic solvents, a variation in intrinsic viscosity of about 0.3–5 is possible, while substitution halogenation in aqueous medium usually results in products of which the intrinsic viscosity varies between about 1 and 3.

Dependent on their intrinsic viscosities, the halogenation products may be used as paint bases or for the preparation of objects, including threads, tires, tubing, films, etc. Films made from chlorinated polybutadiene are stronger and also thermally more stable than films obtained from chlorinated or hydrochlorinated rubber.

As elementary halogens for the present process especially chlorine and bromine are to be used. The process is primarily important, however, for performing chlorinations.

A very attractive embodiment of the new process is a continuous halogenation, in which:

(1) The reactor is at the start filled with polymer-free carbon tetrachloride, which at the temperature and pressure of the reaction is saturated with HCl or HBr,
(2) at the temperature and pressure of the reaction are introduced into the reactor
   (a) a 3 to 8 percent by weight polymer solution in carbon tetrachloride, which solution has previously been saturated with HCl or HBr at this temperature and pressure, and
   (b) elementary halogen and
(3) enough insolubilized halogenation products and liquid discharged from the reactor as to obtain a constant or almost constant volume of the reactor charge.

Because the above continuous embodiment of the process is started in a special way, the halogenation of the polymer supplied proceeds very smoothly and the concentration of dissolved polymer in the reactor remains almost nil, so that the viscosity of the medium remains low.

The process according to the invention is further elucidated by the following examples:

EXAMPLE I

A number of comparative experiments were performed, in which a solution of polybutadiene in $CCl_4$ was chlorinated while using HCl gas. The polybutadiene had been obtained by Ziegler polymerization in the presence of a cobalt compound as catalyst-forming component and had a cis-1,4 content of about 96%. The intrinsic viscosity of the polymer (at 25° C. in toluene) was 2.1. The concentration of the solutions to be chlorinated was 0.5 g. of polybutadiene per 100 ml. of $CCl_4$. The volume of the reactor was 500 ml., the reaction volume being 400 ml., the reaction time ½ hour, while the chlorine gas was introduced at a rate of 12 g./h. The following Table I lists the reaction temperatures, the rates at which the HCl gas was passed through and the solubility values of the halogenation products obtained. The solubility values have been obtained by measurements of 1.0% w. solutions of the halogenation products in cyclohexanone by means of the Bausch and Lomb photometer, using light with a wavelength of $600/\mu$. The criterion applied is the value found by measuring pure cyclohexanone, which value was put at 100. Low values indicate cross-linking of the chlorinated product, leading to insolubility. The chlorine contents of the products varied from about 56.5 to about 57% w., the intrinsic viscosities from about 2.5 to about 3.5 (at 25° C. in cyclohexanone). The values of products made according to the process of this invention containing 40–60% halogen by weight have solubility values of at least about 50, while the values of products prepared in the absence of 1–15 atmospheres of hydrogen chloride are about 25 or less, indicating substantial cross-linking.

*Table I*

| Experiment No. | Reaction Temp., ° C. | HCl gas, l./h. | Solubility |
|---|---|---|---|
| 1 | 3 | 46 | 70 |
| 2 | 3 | 23 | 77 |
| 3 | 3 | 8 | 54 |
| 4 | 25 | 46 | 75.5 |
| 5 | 50 | 46 | 97 |
| 6 | 50 | 23 | 91.5 |
| 7 | 50 | 8 | 77 |

EXAMPLE II

A series of experiments (Nos. 8–10) were performed, in which the polybutadiene in $CCl_4$ described in Example I was chlorinated continuously at various temperatures at atmospheric pressure. The feed applied was a 5% w. polybutadiene solution in $CCl_4$, saturated at the temperature and pressure of the reaction with HCl gas. This solution was passed at a rate of 880 ml. per hour to a stirred reactor with a capacity of 500 ml., which contained at the start 300 ml. of polymer-free $CCl_4$, which had likewise been saturated with HCl gas at the temperature and pressure of the reaction. Also, chlorine gas was passed into the reactor at a rate of 56 g./h. As soon as the volume of the reactor charge had risen to 400 ml., enough of the reactor contents was discharged at such a rate as to maintain the reaction volume at 400 ml. From the suspensions discharged the insoluble chlorination products could be easily isolated by filtration. The chlorine content of these products was invariably about 56% w. The filtrates were again used in the process, while the separated chlorination products were suspended in water and then in these suspensions subjected to substitution chlorination in the presence of ultra-violet light at 25° C. These chlorinations were completed as soon as the chlorine contents had risen to 68% w.

The solubility values of the products with about 56% w. of chlorine obtained in the continuous chlorinations performed in CCl₄, were determined as described in Example I. For comparison, in a second series of experiments (Nos. 11–13) the chlorinations performed in CCl₄ were repeated without application of hydrogen halide, the other conditions being the same or almost the same. The solubility values were determined also of the halogenation products now obtained, the chlorine content of which was again about 56% w. The temperatures applied, as well as the solubility values found, are listed in Table II.

*Table II*

| Experiment No. | Reaction Temp., °C. | Solubility Value | Remarks |
|---|---|---|---|
| 8 | +50 | 28.5 | HCl gas applied. |
| 9 | +3 | 54 | Do. |
| 10 | −20 | 98 | Do. |
| 11 | +25 | 17 | No HCl gas applied. |
| 12 | +3 | 13 | Do. |
| 13 | −20 | 20 | Do. |

EXAMPLE III

Two experiments were performed continuously in the way described in Example II, the difference being that the reaction temperature was in both cases +20° C. and that an elevated hydrochloric acid gas pressure was applied as shown in Table III. In both experiments, the chlorine content of the chlorination product discharged was 56.8% w. The table also gives the solubilities of these products, again expressed as described in Example I.

*Table III*

| Reaction Temp., °C. | HCl Pressure, atm. | Solubility |
|---|---|---|
| +20 | 4 | 67 |
| +20 | 6 | 95 |

EXAMPLE IV

Of a styrene/butadiene rubber obtained by redox emulsion copolymerization of butadiene with styrene at 5° C., a 5% solution in CCl₄ was prepared and this solution was chlorinated as described in Example II using HCl gas at atmospheric pressure at a reaction temperature of −20° C. Saturation with hydrochloric acid gas was also performed at this temperature and pressure. The isolated chlorination product had a chlorine content of 49.3% w., the solubility value as described in Example I being 90.

EXAMPLE V

In the same way as described in Example IV a polybutadiene in CCl₄ obtained by redox emulsion polymerization at 5° C. was chlorinated continuously at −20° C. and atmospheric pressure using HCl gas. The halogenation product contained 56.8% w. of chlorine; the solubility, determined as described in Example I, could be rated as 98.

I claim as my invention:

1. The process for halogenating a rubbery butadiene polymer containing at least about 65% by weight of butadiene comprising reacting the polymer with an elemental halogen having an atomic weight greater than 30 in a tetrahalomethane solvent at temperatures between about −30° C. and +50° C. in the presence of 1–15 atmospheres hydrogen halide pressure whereby a halogenated polymer having 40–68% by weight of halogen separates from the tetrahalomethane and is separated therefrom.

2. The process of chlorinating a rubbery butadiene polymer containing at least about 65% by weight of butadiene comprising reacting the polymer with elemental chlorine in a tetrahalomethane at temperatures between about −30° C. and +50° C. in the presence of 1–15 atmospheres hydrogen chloride pressure, whereby a chlorinated polymer having 40–68% by weight of chlorine precipitates from the tetrahalomethane and is recovered therefrom.

3. The process of chlorinating a rubbery butadiene polymer containing at least about 65% by weight of butadiene comprising reacting the polymer with elemental chlorine in carbon tetrachloride at temperatures between about −30° C. and +50° C. in the presence of 1–15 atmospheres hydrogen chloride pressure, whereby a chlorinated polymer having 40–68% by weight of chlorine precipitates from the carbon tetrachloride and is recovered therefrom.

4. A process according to claim 1 wherein the polymer is a homopolymer of butadiene.

5. A process according to claim 1 wherein the polymer is a copolymer of butadiene-1,3 and monovinyl compounds copolymerizable therewith, containing at least 65% by weight of butadiene copolymerized therein.

6. A process according to claim 1 wherein the polymer is a butadiene-styrene copolymer containing at least about 65% by weight of butadiene copolymerized therein.

7. A process according to claim 3 wherein chlorination is conducted at temperatures of +15° C. to +25° C. under hydrogen chloride pressures of 4–10 atmospheres.

No references cited.

JOSEPH L. SCHOFER, *Primary Examiner.*

W. HOOVER, *Assistant Examiner.*